GUSTAV BARTEL.
Improvement in Hat Presses.

No. 118,578. Patented Aug. 29, 1871.

2 Sheets--Sheet 1.

Witnesses:
Ernst Bilhuber
C. Wahlers

Inventor:
Gustav Bartel
per
Van Santvoord & Hauff
Attys

GUSTAV BARTEL.
Improvement in Hat Presses.
No. 118,578. Patented Aug. 29, 1871.

Witnesses:
Inventor:
Gustav Bartel 118,578

UNITED STATES PATENT OFFICE.

GUSTAV BARTEL, OF NEW YORK, N. Y.

IMPROVEMENT IN HAT-PRESSES.

Specification forming part of Letters Patent No. 118,578, dated August 29, 1871.

*To all whom it may concern:*

Be it known that I, GUSTAV BARTEL, of the city, county, and State of New York, have invented a new and Improved Hat-Press; and I do hereby declare the following to be a full, clear, and exact description thereof, which will enable those skilled in the art to make and use the same, reference being had to the accompanying drawing forming part of this specification, in which drawing—

Figure 1:
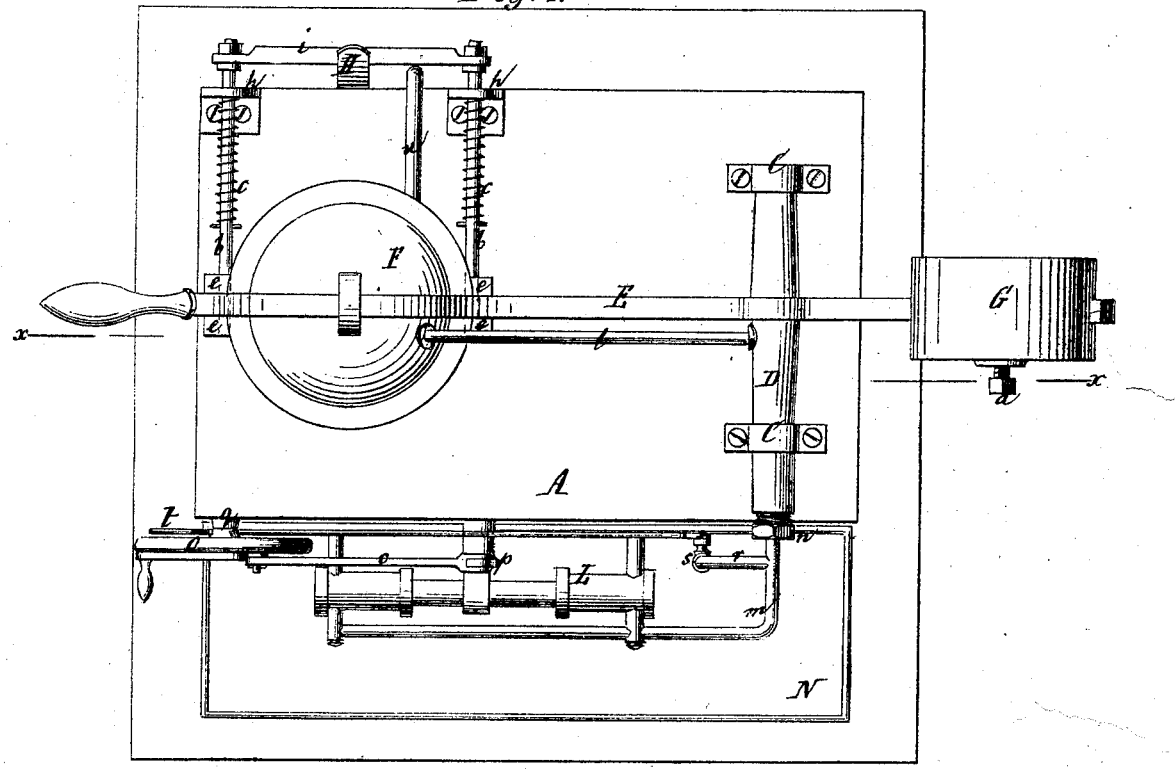
Figure 2:
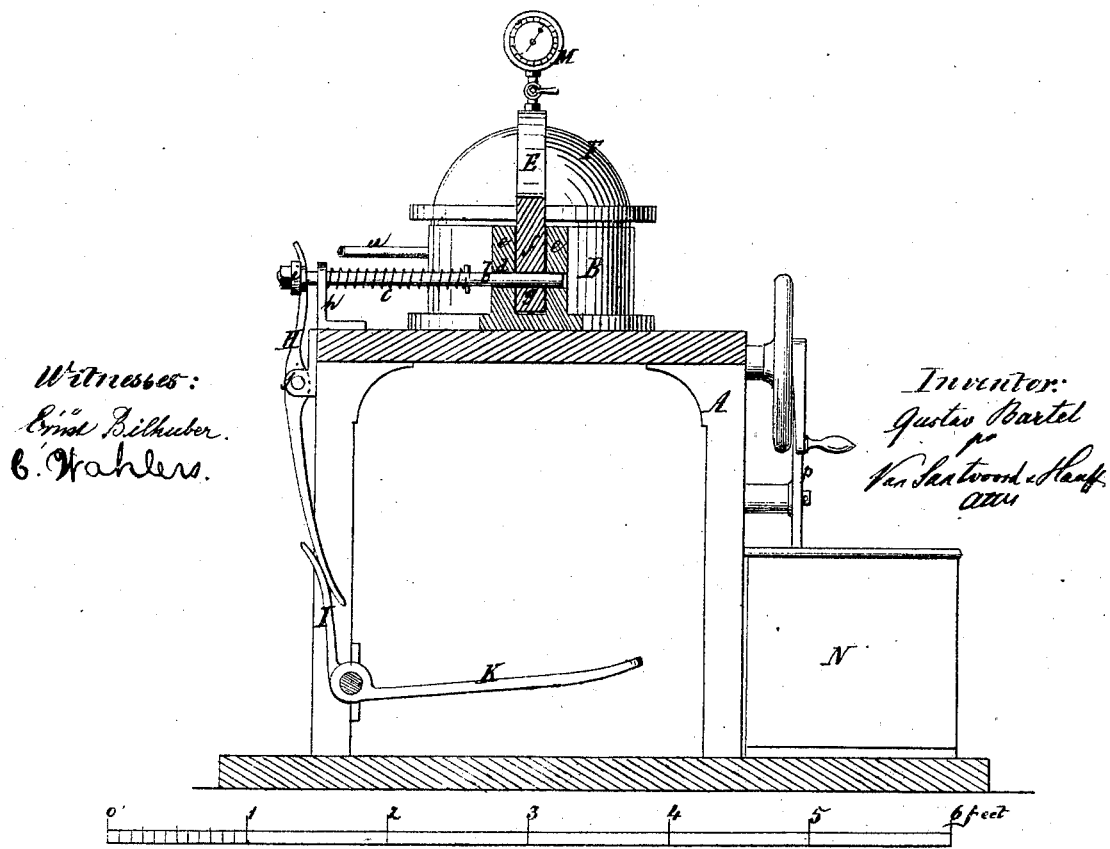
Figure 3:
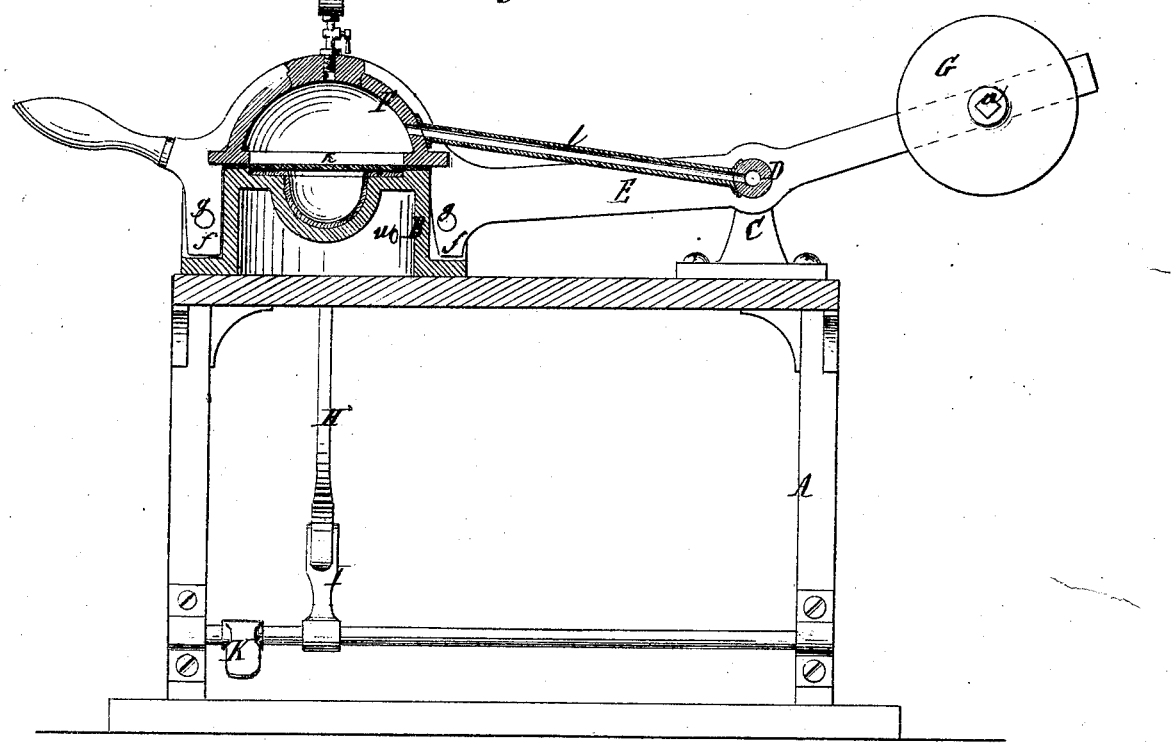
Figure 4:
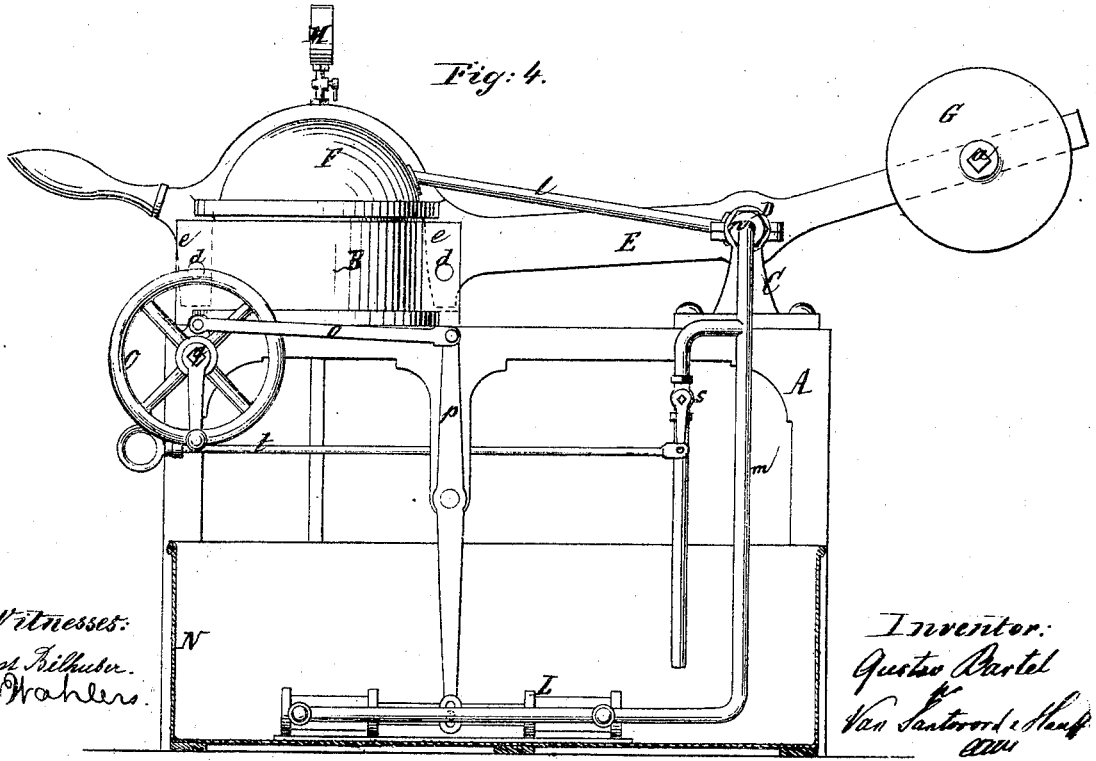

Figure 1 represents a plan or top view of my press. Fig. 2 is a sectional front view of the same. Fig. 3 is a longitudinal vertical section of the same, the line $x\,x$, Fig. 1, indicating the plane of section. Fig. 4 is a side view of the same.

Similar letters indicate corresponding parts.

This invention relates to certain improvements in that class of hat-presses in which the hats are shaped by the action of hydraulic pressure on an elastic diaphragm. The water-chamber in my press is secured to the end of an arm extending from a hollow rock-shaft, and it is balanced by an adjustable weight. Through the hollow rock-shaft the water is admitted to the water-chamber, and also drawn off therefrom. The water is forced into the water-chamber from a tank situated on the side of the press-frame, and containing a force-pump, which is operated by a hand-wheel on the side of the frame. A blow-off cock operated by a rod, extending to the front of the machine and situated in a pipe branching off from the water-supply pipe, serves to withdraw the water from the water-chamber. The water-chamber is locked down upon the mold by spring-bolts operated by a treadle.

In the drawing, A designates a frame, which supports the mold B, and from which rise two standards, C, forming the bearings for the rock-shaft D. On this rock-shaft is firmly secured an arm, E, which carries on one end the water-chamber F, while on its other end is fitted a balance-weight, G, which is adjusted in the required position by a set-screw, $a$. The water-chamber is locked down upon the mold by means of bolts $b$, which are subjected to the action of springs $c$, and which, when allowed to follow the action of these springs, catch in holes $d$ in lugs $e$ projecting from the sides of the mold. On the arm E are projections $f$, provided with holes $g$, (see Fig. 3,) and if the water-chamber is pressed down upon the mold the holes $g$ correspond with the holes $d$ in the lugs $e$, and the bolts can be made to pass through said holes so as to lock down the water-chamber. The bolts $b$ slide in lugs $h$ secured to the frame A, and their outer ends are connected by a cross-bar, $i$, which is subjected to the action of a lever, H. (See Fig. 2.) This lever has its fulcrum on a pivot, $j$, and its bottom end bears against an arm, I, projecting from a treadle, K, so that by depressing said treadle with the foot the bolts $b$ are forced back against the action of their springs and the arm E is released, allowing the water-chamber to be swung off from the mold. To facilitate this operation the balance-weight G is so adjusted that the water-chamber is swung off automatically as soon as the arm E is released, and that but little power is required to turn down the water-chamber upon the mold. The water-chamber F is closed by an elastic diaphragm, $k$, by preference made of India rubber, and from said water-chamber extends a pipe, $l$, to the rock-shaft D, which is hollow, and communicates by a pipe, $m$, with a pump, L. The connection between this pipe and the rock-shaft is effected by a stuffing-box, $n$, Figs. 1 and 4, so that the rock-shaft can turn while the pipe remains stationary without breaking the joint. A gauge, M, applied to the water-chamber serves to indicate the pressure existing in said chamber. The pump L is a double-acting force-pump, and it is situated in a tank, N, close to the side of the frame A. It is operated by means of a hand-wheel, O, which connects, by a rod, $o$, and working-beam $p$, with the plunger-rod of the pump. Said hand-wheel has its bearing on a stud, $q$, secured in the side of the frame in a convenient position to be operated by the person standing in front of the press. From the water-pipe $m$ extends a branch-pipe, $r$, which is provided with a stop-cock, $s$, to the handle of which is secured a rod, $t$, that extends to the front of the machine. By pulling this rod the stop-cock can be opened and the water contained in the chamber F is allowed to blow off.

The mold B is hollow, and connected to a steam-pipe, $u$, so that it can be heated to the proper temperature before the operation of pressing commences.

The hat-blank to be pressed is adjusted on the mold, and chamber F is brought down and locked by means of the bolts $b$, the felt itself assisting to render the joints tight. The pump L is started, and as the elastic diaphragm expands by the pressure of the water the felt is pressed down into the mold and the hat is brought in the required shape. As soon as this effect is accomplished the pump is stopped, the stop-cock $s$ is opened, and the chamber F is raised so that the finished hat can be taken out and a new blank can be introduced.

By these means the operation of pressing hats is rendered comparatively easy, and it can be accomplished with great rapidity.

What I claim as new, and desire to secure by Letters Patent, is—

1. In a hat-press, the arrangement of the hollow rotating rock-shaft D, serving as an axis for the lever E, and a water communication for the supply-pipe $l$ of the water-chamber F, when the several parts operate in connection with the mold B, substantially as and for the purpose specified.

2. The water-chamber F, lever E, and weight G, in combination with the pipe $l$, rotating hollow shaft D, pipe $m$, and pump L, operating substantially as and for the purpose set forth.

3. The hand-wheel O, lever $p$, and pump L, in combination with the hollow rock-shaft D, chamber F, and mold B, as described.

4. The blow-off pipe $r$, stop-cock $s$, and rod $t$, in combination with the hollow rock-shaft D, chamber F, and mold B, as set forth.

5. The bolts $b$, lever H, and treadle K, in combination with the chamber F, mold B, arm E, rock-shaft D, and balance-weight G, substantially as described.

This specification signed by me this 3d day of July, 1871.

GUSTAV BARTEL.

Witnesses:
W. HAUFF,
E. F. KASTENHUBER.